(12) United States Patent
Kwon et al.

(10) Patent No.: US 10,937,291 B2
(45) Date of Patent: Mar. 2, 2021

(54) ELECTRONIC LABEL WITH BURGLARPROOF FUNCTION FOR GOODS

(71) Applicant: SOLUM CO., LTD., Yongin-si (KR)

(72) Inventors: Woo Chan Kwon, Suwon-si (KR); Se Uk Jeon, Suwon-si (KR); Keun Hwa Jung, Hwaseong-si (KR); Yong Bum Lee, Suwon-si (KR)

(73) Assignee: SOLUM CO., LTD., Yongin-si (KR)

( * ) Notice: Subject to any disclaimer, the term of this patent is extended or adjusted under 35 U.S.C. 154(b) by 0 days.

(21) Appl. No.: 16/678,191

(22) Filed: Nov. 8, 2019

(65) Prior Publication Data

US 2020/0160681 A1 May 21, 2020

(30) Foreign Application Priority Data

Nov. 15, 2018 (KR) .................. 10-2018-0140746

(51) Int. Cl.
| | |
|---|---|
| *G08B 13/14* | (2006.01) |
| *G08B 13/24* | (2006.01) |
| *G06K 19/06* | (2006.01) |
| *G08B 3/10* | (2006.01) |
| *G09F 3/03* | (2006.01) |
| *G09F 3/14* | (2006.01) |
| *G09F 3/00* | (2006.01) |

(52) U.S. Cl.
CPC ... *G08B 13/2434* (2013.01); *G06K 19/06028* (2013.01); *G08B 3/10* (2013.01); *G09F 3/0376* (2013.01); *G09F 3/14* (2013.01); *G09F 3/0297* (2013.01)

(58) Field of Classification Search
None
See application file for complete search history.

(56) References Cited

U.S. PATENT DOCUMENTS

| | | | | |
|---|---|---|---|---|
| 5,955,951 | A * | 9/1999 | Wischerop | E05B 73/0017 340/10.42 |
| 6,188,320 | B1 * | 2/2001 | Kolton | G08B 13/2434 340/568.1 |
| 2005/0218218 | A1 * | 10/2005 | Koster | G09F 3/204 235/383 |
| 2007/0120381 | A1 | 5/2007 | Ehrensvard et al. | |

(Continued)

FOREIGN PATENT DOCUMENTS

| | | |
|---|---|---|
| EP | 1063627 A2 | 12/2000 |
| EP | 3065120 A2 | 9/2016 |

(Continued)

OTHER PUBLICATIONS

The extended European search report dated Apr. 2, 2020 for European Application No. 19208526.4.

(Continued)

*Primary Examiner* — Brent Swarthout
(74) *Attorney, Agent, or Firm* — Insight Law Group, PLLC; Seung Ho Lee (57) ABSTRACT

The present invention relates to an electronic label with a burglarproof function for goods which includes a coupling structure having a ring form directly hung on a product and in which another coupling structure having the ring form is used in place of the coupling structure even when the coupling structure having the ring form is damaged.

10 Claims, 9 Drawing Sheets

(56) References Cited

U.S. PATENT DOCUMENTS

| | | | |
|---|---|---|---|
| 2008/0266111 A1* | 10/2008 | Shute | G09F 3/0358 |
| | | | 340/572.9 |
| 2008/0316028 A1* | 12/2008 | Conti | E05B 73/0029 |
| | | | 340/568.2 |
| 2011/0043339 A1 | 2/2011 | McGregor | |
| 2013/0247337 A1* | 9/2013 | Zimmel | B65C 7/001 |
| | | | 24/367.1 |
| 2015/0035674 A1 | 2/2015 | Karhuketo | |
| 2016/0162775 A1* | 6/2016 | Zeng | H01Q 1/2225 |
| | | | 235/375 |

FOREIGN PATENT DOCUMENTS

| | | |
|---|---|---|
| JP | 2008-204218 A | 9/2008 |
| KR | 10-2009-0067293 A | 6/2009 |
| KR | 10-2015-0008101 A | 1/2015 |
| KR | 10-2016-0078205 A | 7/2016 |
| KR | 10-2017-0058814 A | 5/2017 |
| KR | 10-1854463 A | 7/2018 |

OTHER PUBLICATIONS

Office Action issued from Korean Patent Office dated Oct. 10, 2019 for Korean Application No. 10-2018-0140746.
The Notice of Allowance dated Apr. 17, 2020 for Korean Application No. 10-2018-0140746.

* cited by examiner

ELECTRONIC LABEL WITH BURGLARPROOF FUNCTION FOR GOODS

CROSS-REFERENCE TO RELATED APPLICATION(S)

This application claims priority from Korean Patent Application No. 10-2018-0140746, filed on Nov. 15, 2018, in the Korean Intellectual Property Office, the disclosure of which is incorporated herein by reference in its entirety.

BACKGROUND

1. Field

The following description relates to an electronic label which electronically displays product information, and more particularly, to an electronic label with a burglarproof function for goods.

2. Description of Related Art

Electronic label technologies are known. Electronic labels are connected to gateways through short-range communication, and information received from servers through the gateways is displayed on electronic displays. The electronic labels are installed on shelves of large stores on which products are displayed and display product information such as prices, proprietary names, or the like of the displayed products. Since the electronic labels are capable of renewing price information through a communication function, the electronic labels assist the large stores in managing the products.

In Korea Patent Publication No. 10-2015-0008101 (Jan. 21, 2015), a flexible electronic label tag fixed to clothes is disclosed. The electronic label tag may be attached to a product thereof by an attachment unit, such as a plastic covered metal loop or a loop like a pin attachable to the electronic label tag, and may be removed by a standard magnetic-remover.

The electronic label tag has a burglarproof function, and in a case in which the attachment unit is forcibly removed and/or opened, or the metal loop is ripped or cut off, the electronic label tag sounds an alarm within, for example, 30 seconds. However, the electronic label tag has a problem in that the electronic label tag cannot be replaced and used when the attachment unit is removed or when the metal loop is ripped or cut off.

Accordingly, the present inventor has studied an electronic label with a burglarproof function for goods which includes a coupling structure having a ring form directly hung on a product instead of a form attached to the product and in which, even when the coupling structure having the ring form is damaged, another coupling structure can be used in place of the damaged coupling structure.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. The following description relates to an electronic label with a burglarproof function for goods, which includes a coupling structure having a ring form, and in which, even when the coupling structure having the ring form is damaged, another coupling structure having the ring form may be used in place of the coupling structure.

In one general aspect, an electronic label with a burglarproof function for goods includes a short-range wireless communication part configured to receive product information from a management server, a memory configured to store the product information received through the short-range wireless communication part, a display configured to electronically display the product information stored in the memory, and a controller configured to perform overall control of the electronic label including control of receiving, storing, and displaying the product information, wherein the electronic label includes a burglarproof ring which performs a function of being hung on a product and a burglarproof function and is replaceable, and a coupling unit coupled to the burglarproof ring.

The burglarproof ring may include a flexible conductive wire, an insulating cloth which wraps an outer circumference of the flexible conductive wire, a burglarproof pin formed at one end of the flexible conductive wire, and a hooking piece formed at the other end of the flexible conductive wire.

The coupling unit may include a pin connector connected to the burglarproof pin formed at the one end of the flexible conductive wire, and a fixing groove into which the burglarproof pin formed at the one end of the flexible conductive wire is inserted to pass therethrough and which is hooked on the hooking piece formed at the other end of the flexible conductive wire wrapped with the insulating cloth to fix the flexible conductive wire to the electronic label.

The controller may detect whether a current flows through the flexible conductive wire to determine whether burglary occurs.

The controller, in a case in which the flexible conductive wire is cut or the burglarproof pin is separated from the pin connector and thus a current flowing through the flexible conductive wire is interrupted, may determine whether the current interruption is normal, and when the current interruption is not normal, may determine that burglary occurs.

The controller, in a case in which the burglarproof pin is separated from the pin connector by a pin separating unit, may determine that the case is a normal current interruption case.

The controller, in a case in which a signal of a magnetic field generated by a magnet attached to the pin separating unit which separates the burglarproof pin from the pin connector is detected, may determine that the case is a normal current interruption case.

The pin connector may be formed under the fixing groove to be spaced apart from the fixing groove vertically.

The hooking piece may be positioned on a surface opposite to a surface on which the pin connector is formed.

The controller, in a case of normal current interruption, may request to unassign the electronic label assigned to a product and remove product information stored in the memory.

The electronic label with a burglarproof function for goods may further include a warning part configured to warn of the burglary in a case in which the controller determines that burglary occurs.

The warning part may output an alarm sound to perform an acoustic warning.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, in order to facilitate understanding and embodiment by those skilled in the art, the present invention will be described in detail by explaining exemplary embodiments with reference to the accompanying drawings. Although specific embodiments are illustrated in the drawings and detailed explanations are described, the embodiments are not intended to limit the embodiments of the present invention in the specific forms.

In the description of the invention, when it is determined that detailed descriptions of related well-known functions unnecessarily obscure the gist of the invention, the detailed descriptions thereof will be omitted.

It will be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements.

Figure 1:
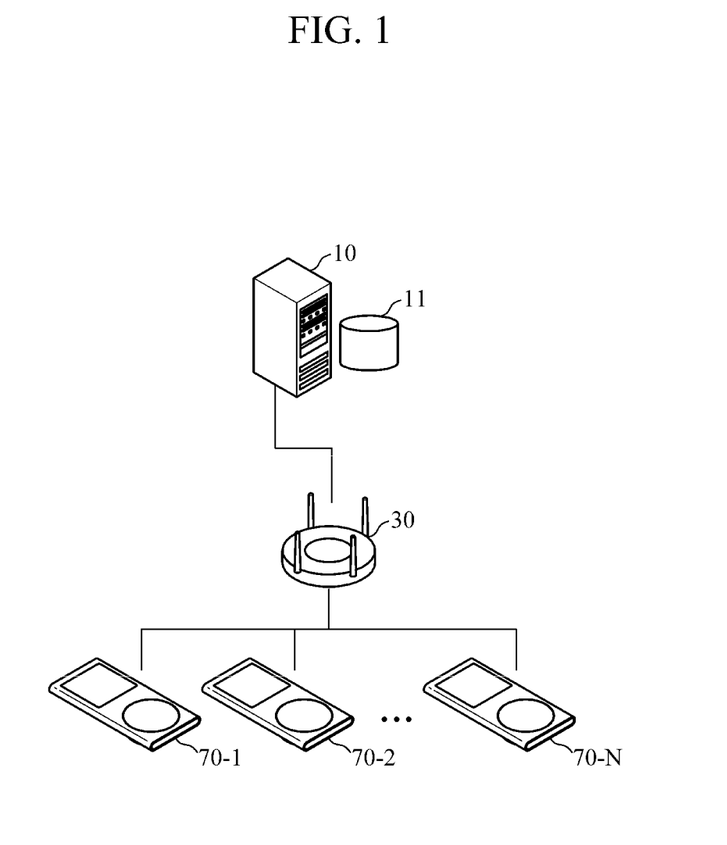
FIG. 1 is a block diagram illustrating a configuration of a typical electronic label system.

FIG. 1 is a block diagram illustrating a configuration of a typical electronic label system. As illustrated in FIG. 1, the electronic label system includes a management server 10 including a database 11 storing product sales information, one or more gateways 30 connected to the management server through a network such as Ethernet or the like, and a plurality of electronic labels 70-1 to 70-N, which are attached to products, grouped by each gateway, and connected thereto.

The gateways 30 and the electronic labels 71-0 and 70-2 to 70-N which belong to the group of the gateways may communicate with each other through short-range wireless communication according to, for example, the standard IEEE 802.15.4 or IEEE 801.15.11, or a protocol defined over a PHY/MAC layer of Bluetooth or the like. The electronic labels stand by in sleep mode, are woken up at arbitrary times, and try to access the gateways.

The management server 10 manages identification information of the electronic labels, identification information of products that the electronic labels displays, and product information of the products. A manager reads a barcode of the electronic label and a barcode of the product to transmit the read barcodes to the management server 10 using a mobile terminal, and the management server assigns the corresponding electronic label to the corresponding product. Then, when power is supplied, the electronic label is activated, and the mobile terminal receives product information from the management server 10 through the gateway 30 and displays the product information.

Figure 2:
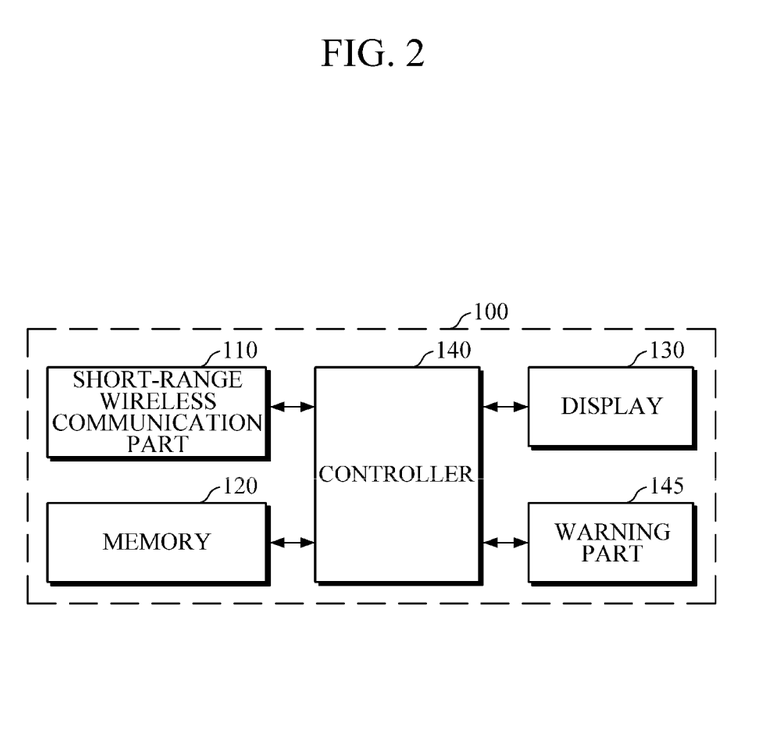
FIG. 2 is a block diagram illustrating a configuration of an electronic label with a burglarproof function for goods according one embodiment of the present invention.
Figure 3A:
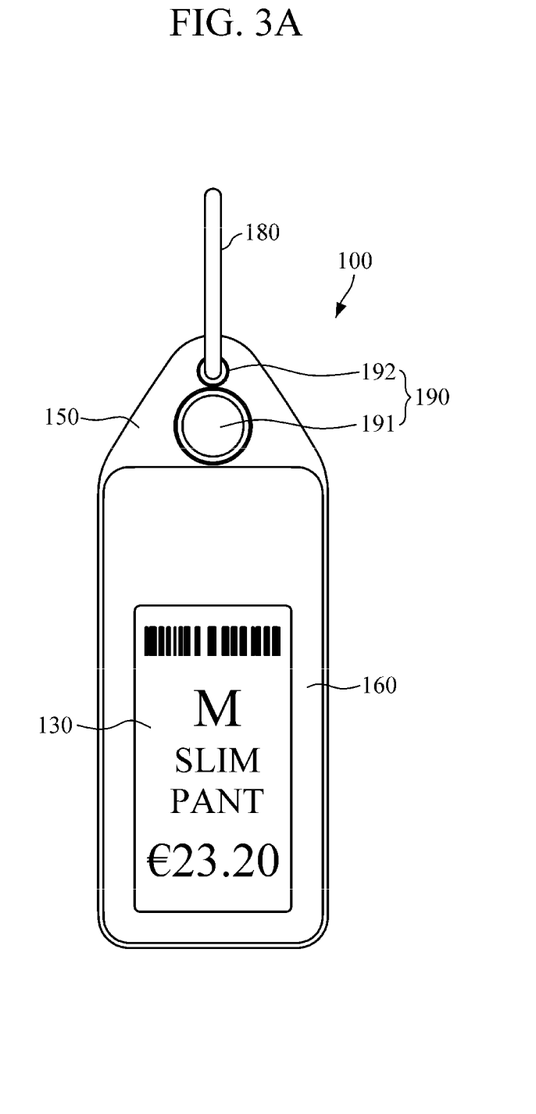
FIGS. 3A to 3D are respectively front, rear, side, and perspective views illustrating an exterior of the electronic label with a burglarproof function for goods according to the present invention.
Figure 3B:
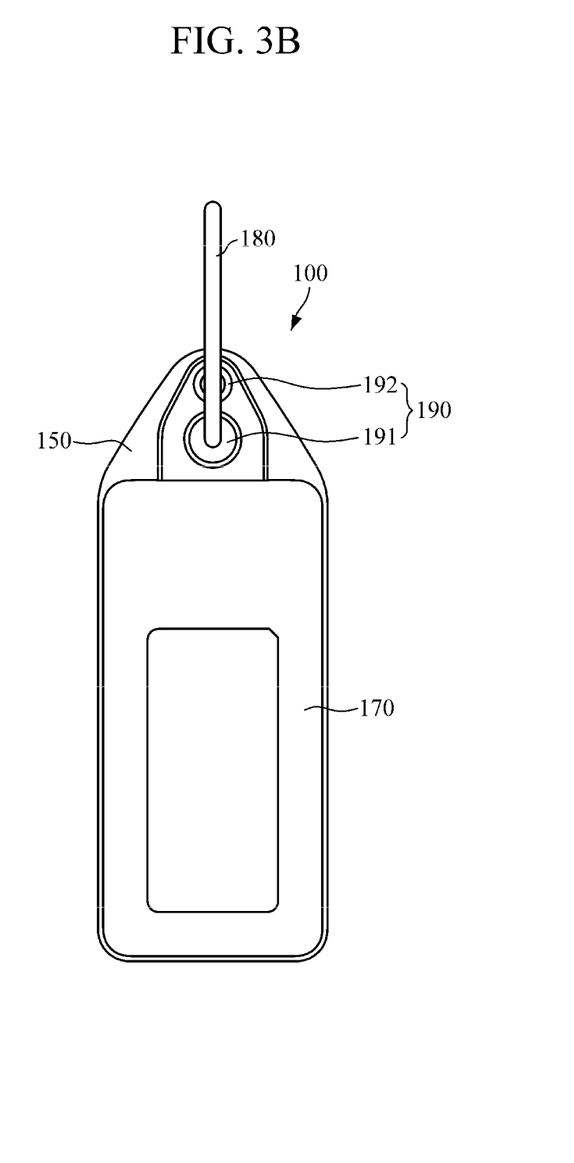
Figure 3C:
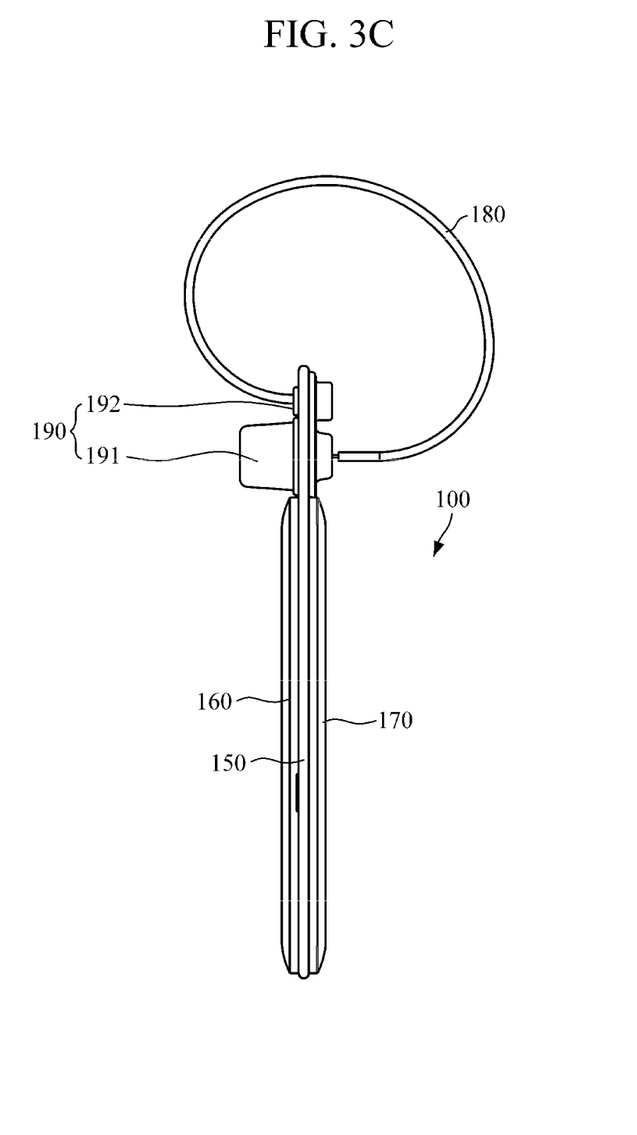
Figure 3D:
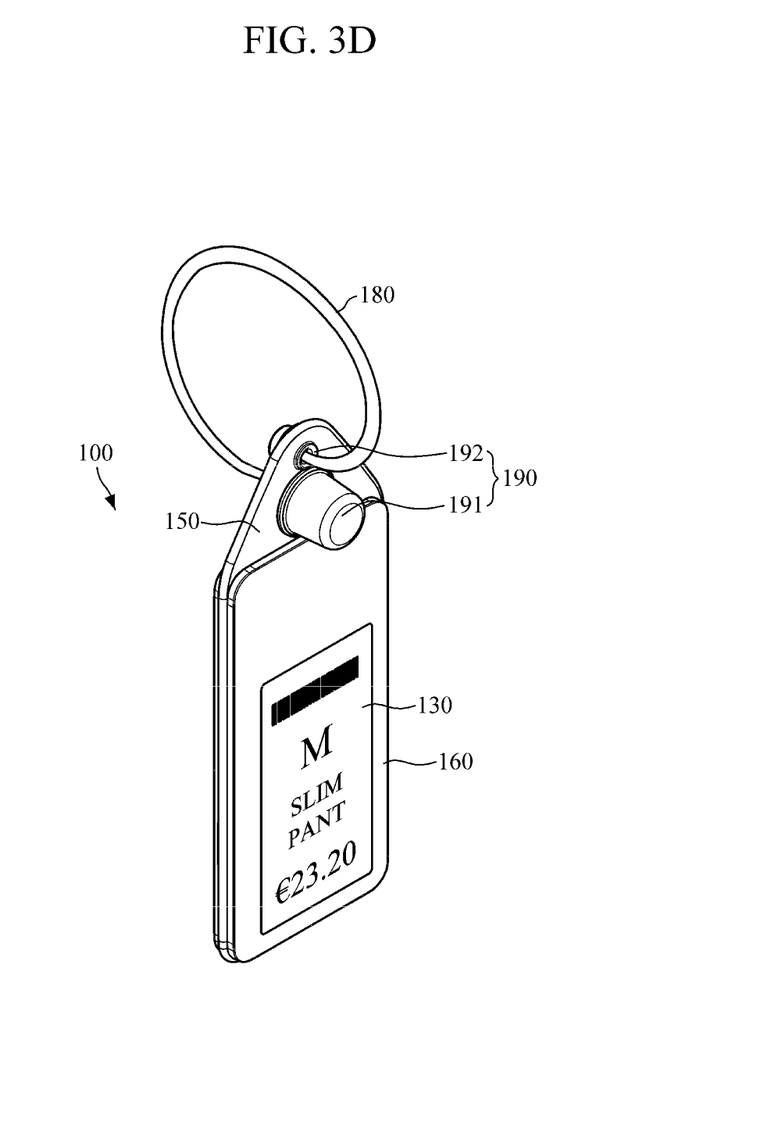

FIG. 2 is a block diagram illustrating a configuration of an electronic label with a burglarproof function for goods according one embodiment of the present invention. As illustrated in FIG. 2, an electronic label 100 with a burglarproof function for goods according to the embodiment includes a short-range wireless communication part 110, a memory 120, a display 130, and a controller 140.

The short-range wireless communication part 110 receives product information from a management server. When the electronic label is assigned to a product, product information such as a proprietary name, a price, and a product description which matches with product identification information is stored in the management server. When the electronic label is activated, the product information is received from the management server through the short-range wireless communication part 110.

In this case, the short-range wireless communication part 110 may be implemented to receive the product information from the management server through a short-range communication method such as Bluetooth or ZigBee, but is not limited thereto.

The memory 120 stores the product information received through the short-range wireless communication part 110. For example, the memory 120 may be an electrically erasable programmable read-only memory (EEPROM), a flash memory, or the like, but is not limited thereto.

The display 130 electrically displays the product information stored in the memory 120. For example, the display 130 may be a segment type electronic paper display.

The controller 140 may be implemented as the form of a processor and control overall functions of the electronic label, wherein the overall functions include receiving the product information through the short-range wireless communication part 110, storing the product information in the memory 120, and controlling product information display on the display 130.

In this case, the controller 140 may be implemented as the form of a system-on-chip (SoC) in which the short-range wireless communication part 110, the memory 120, and the controller 140 are integrated in a single chip, and the display 130 may be operated through a general-purpose input/output (GPIO) port of the SoC.

Meanwhile, although not illustrated in the drawing, the electronic label 100 with a burglarproof function for goods may include a barcode, a quick response (QR) code, a radio frequency (RF) tag, or the like for identifying the electronic label. In addition, the electronic label 100 with a burglarproof function for goods may also include a circuit and a battery for supplying power thereto.

FIGS. 3A to 3D are respectively front, rear, side, and perspective views illustrating an exterior of the electronic label with a burglarproof function for goods according to the present invention. As illustrated in the drawings, the electronic label 100 with a burglarproof function for goods according to the embodiment includes a substrate 150, a front housing 160, and a rear housing 170.

The short-range wireless communication part 110, the memory 120, the display 130, and the controller 140, which are illustrated in FIG. 2, are modularized on the substrate 150, and the substrate 150 is covered by the front housing 160 and the rear housing 170. The front housing 160 is implemented to expose the display 130, and a cover, which is opened when a battery is replaced, may be formed in the rear housing 170.

Meanwhile, the electronic label 100 with a burglarproof function for goods according to the embodiment performs a function of being hung on a product and also performs a burglarproof function and includes a burglarproof ring 180 and a coupling unit 190 to which the burglarproof ring is coupled.

For example, in a state in which the coupling unit 190 is not covered by the front housing 160 and the rear housing 170 and is formed in an upper portion, in which a part thereof is externally exposed, of the substrate 150, and the burglarproof ring 180 is hung on a product, the burglarproof ring 180 may be coupled to the coupling unit 190.

Figure 4:
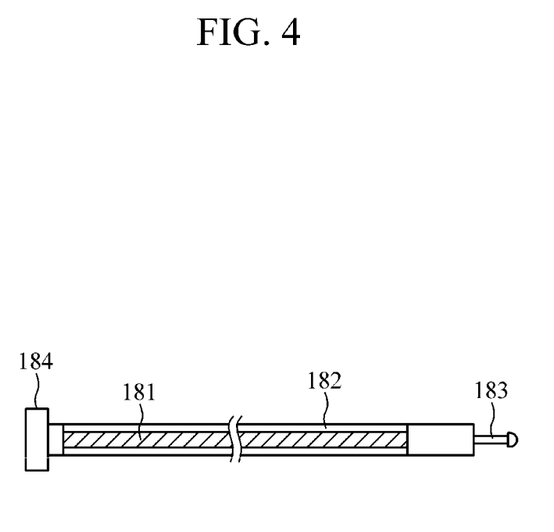
FIG. 4 is a cross-sectional view illustrating a burglarproof ring of the electronic label with a burglarproof function for goods according to one embodiment of the present invention.

FIG. 4 is a cross-sectional view illustrating the burglarproof ring of the electronic label with a burglarproof function for goods according to one embodiment of the present invention. The burglarproof ring 180 according to the embodiment includes a flexible conductive wire 181, an insulating cloth 182, a burglarproof pin 183, and a hooking piece 184.

The flexible conductive wire 181 may be a flexible conductive metal or alloy which is easily bent. The insulating cloth 182 wraps and protects an outer circumference of flexible conductive wire 181. Meanwhile, the burglarproof pin 183 is formed at one end of the flexible conductive wire 181, and the hooking piece 184 is formed at the other end.

Meanwhile, the coupling unit 190 includes a pin connector 191 and a fixing groove 192. For example, the pin connector 191 and the fixing groove 192 may not be covered by the front housing 160 and the rear housing 170 and may be formed to be vertically spaced apart from each other at the upper portion, in which the part is externally exposed, of the substrate 150.

The pin connector 191 is connected to the burglarproof pin 183 formed at one end of the flexible conductive wire 181. In this case, in the pin connector 191, the remaining portion except for a portion connected to the burglarproof pin 183 is molded with an insulating material so as to not be externally exposed.

Figure 5:
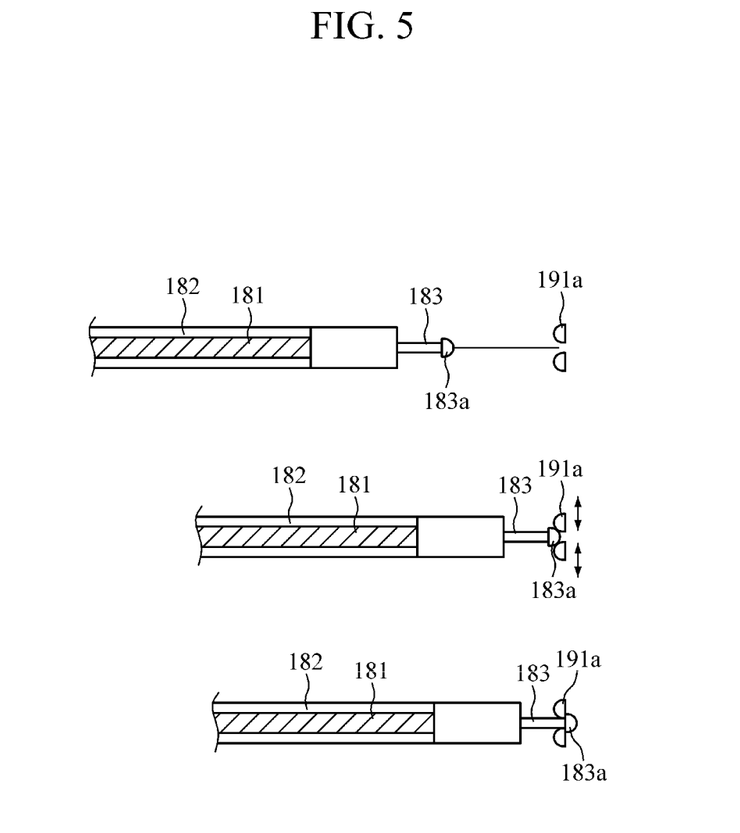
FIG. 5 is a cross-sectional view illustrating an example of a pin connector of the electronic label with a burglarproof function for goods according to the present invention.

FIG. 5 is a cross-sectional view illustrating an example of the pin connector of the electronic label with a burglarproof function for goods according to the present invention. As illustrated in FIG. 5, the pin connector 191 may include at least two reciprocating members 191a of which front surfaces are rounded and rear surfaces have flat shapes.

In this case, the reciprocating member 191a may be implemented to reciprocate due to a mechanical operating unit (not shown) such as a compressing spring or an electromagnetic operating unit (not shown) through an electromagnetic method, but is not limited thereto.

When a rounded front surface of the head 183a of the burglarproof pin 183 enters the pin connector 191, the rounded front surface of the head 183a of the burglarproof pin 183 easily enters the pin connector 191 due to the rounded front surfaces of the reciprocating members 191a, and the reciprocating members 191a are pushed backward, and when the head 183a of the burglarproof pin 183 completely enters the pin connector 191, the reciprocating members 191a are restored to original positions thereof, the flat rear surfaces of the reciprocating members 191a are hooked on a step portion of a rear surface of the head 183a of the burglarproof pin 183, and thus the rear surface of the head 183a does not come out.

The burglarproof pin 183 formed at one end of the flexible conductive wire 181 is inserted into the fixing groove 192 to pass therethrough, the flexible conductive wire 181 wrapped with the insulating cloth 182 is hooked on the hooking piece 184 formed at the other end of the flexible conductive wire 181, and thus the flexible conductive wire 181 is fixed to the electronic label 100.

In this case, threads may be formed on an inner circumference of the fixing groove 192 and a head portion of the hooking piece 184 inserted through the inner circumference of the fixing groove 192, and the inner circumference of the fixing groove 192 may be screw-coupled to the head portion of the hooking piece 184 such that the hooking piece 184 coupled to the fixing groove 192 may not be pulled out.

Meanwhile, when the pin connector 191 is formed below the fixing groove 192 to be vertically spaced apart from the fixing groove 192 and, when the hooking piece 184 is positioned at a surface opposite to a surface on which the pin connector 191 is formed, a weight balance of the burglarproof ring 180 may be maintained when the electronic label 100 is hung on a product.

Since the burglarproof ring 180 is implemented as described above, the burglarproof ring 180 coupled to the coupling unit 190 of the electronic label 100 with a burglarproof function for goods according to the present invention may be simply replaced with another burglarproof ring at any time without a specific mechanical change as necessary.

Meanwhile, according to additional aspect of the present invention, the controller 140 may be implemented to detect whether a current flows through the flexible conductive wire 181 to determine whether a burglary occurs.

For example, the controller 140 may be formed to determine a case in which the flexible conductive wire 181 is cut or the pin connector 191 is disconnected from the burglarproof pin 183, a current flowing through the flexible conductive wire 181 is interrupted, and when the controller 140 determines whether the current interruption is normal, the controller 140 determines that the current interruption is not normal, as a burglary case.

In this case, the controller 140 may be formed to determine a case in which the burglarproof pin 183 is separated from the pin connector 191 by a pin separating unit (not shown), as a normal current interruption case.

For example, the controller 140 may be formed to determine a case, in which a signal of a magnetic field is detected that is generated by a magnet attached to the pin separating unit which separates the burglarproof pin from the pin connector 191, as a normal current interruption case. However, the present invention is not limited thereto, and mechanical or electromagnetic various methods capable of checking whether the pin separating unit is used may be used to determine whether the normal current interruption occurs.

Figure 6:
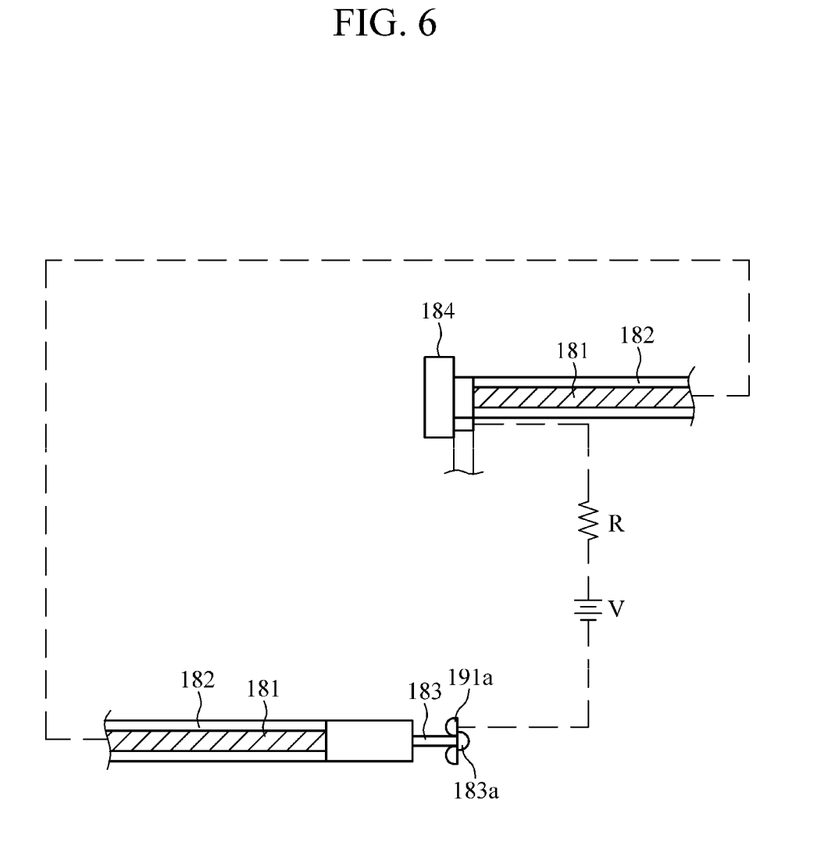
FIG. 6 is a view illustrating an example configuration of a closed circuit of a flexible conductive wire of the burglarproof ring of the electronic label with a burglarproof function for goods according to the present invention.

FIG. 6 is a view illustrating an example configuration of a closed circuit of the flexible conductive wire of the burglarproof ring of the electronic label with a burglarproof function for goods according to the present invention. In a state in which the inner circumference of the fixing groove 192 and the head portion of the hooking piece 184 inserted through the inner circumference of the fixing groove 192 are formed of conductive materials and the burglarproof pin 183 and the pin connector 191 coupled to the burglarproof pin 183 are also formed of conductive materials, when a direct current (DC) power source and a resistor R are connected between the inner circumference of the fixing groove 192 and the pin connector 191, the closed circuit is formed, and thus a current i flows through the flexible conductive wire 181.

When the flexible conductive wire 181 is cut or the burglarproof pin 183 is separated from the pin connector 191, a current does not flow through the flexible conductive wire 181.

Accordingly, when whether a current flows or does not flow through the flexible conductive wire 181, that is, whether a current flows, is detected through the controller 140, whether the flexible conductive wire 181 is cut or the burglarproof pin 183 is separated from the pin connector 191 may be determined.

In this case, in a state in which the burglarproof ring 180 is hung on a product, in a case in which the burglarproof pin 183 is separated from the pin connector 191 by the pin separating unit normally, the case may not be a burglary case, and in a case in which the flexible conductive wire 181 is forcibly cut or the burglarproof pin 183 is forcibly separated from the pin connector 191 without using the pin separating unit, this case may be a burglary case. Accordingly, when the controller 140 is formed to determine whether normal current interruption occurs, the controller 140 may detect a malicious user illegally cutting the burglarproof ring 180 to steal the product.

Meanwhile, when the burglarproof ring 180 is damaged, for example, when the flexible conductive wire 181 is cut, since another burglarproof ring 180 may be used in the electronic label in place of the burglarproof ring 180, the entire electronic label does not need to be replaced.

Meanwhile, according to an additional aspect of the present invention, in the case of normal current interruption, the controller 140 may be formed to request the management server to unassign the electronic label assigned to a product through the short-range wireless communication part 110 and to remove product information stored in the memory 120. The unassigned electronic label may be reassigned to and reused on another product.

Meanwhile, according to another additional aspect of the present invention, the electronic label 100 with a burglarproof function for goods may further include a warning part 145. In a case in which the controller 140 determines that burglary occurs, the warning part 145 warns of the burglary. For example, the warning part 145 may be implemented to output an alarm sound so as to perform an acoustic warning but is not limited thereto.

Accordingly, in a case in which the flexible conductive wire 181 is forcibly cut or the burglarproof pin 183 is forcibly separated from the pin connector 191 without using the pin separating unit, the present invention implemented as described above may provide a warning through the warning part 145 to allow a manager or a nearby person to recognize theft of a product.

As described above, since the electronic label with a burglarproof function for goods according to the present invention includes a coupling structure having a ring form directly hung on a product, even when the coupling structure having the ring form is damaged, another coupling structure having the ring form can be used in place of the coupling structure, and thus a cost needed to use the electronic label with a burglarproof function for goods can be reduced.

The various embodiments disclosed in this specification and drawings are only specific examples to aid in understanding of the invention and are not intended to limit the various embodiments of the present invention.

Accordingly, the scope of the various embodiments of the present invention should not be limited by the above-described embodiments, and all changes or modifications derived from the technical ideas of the various embodiments of the present invention should be construed as being included in the scope of the various embodiments of the present invention.

What is claimed is:

1. An electronic label with a burglarproof function for goods, comprising:
    a short-range wireless communication part configured to receive product information from a management server;
    a memory configured to store the product information received through the short-range wireless communication part;
    a display configured to electronically display the product information stored in the memory; and
    a controller configured to perform overall control of the electronic label including control of receiving, storing, and displaying the product information,
    wherein the electronic label includes a burglarproof ring, which is adapted to be hung on a product, performs a burglarproof function, and is replaceable, and a coupling unit coupled to the burglarproof ring,
    wherein one end of the burglarproof ring is placed on a front surface of a substrate of the electronic label, and another end of the burglarproof ring is placed on a rear surface of the substrate of the electronic label,
    wherein the burglarproof ring includes a flexible conductive wire and a burglarproof pin formed at one end of the flexible conductive wire,
    wherein the coupling unit comprises a pin connector connected to the burglarproof pin formed at the one end of the flexible conductive wire, and
    wherein the controller, in a case in which the flexible conductive wire is cut or the burglarproof pin is separated from the pin connector and a current flowing through the flexible conductive wire is interrupted, determines whether the current interruption is normal, and when the current interruption is normal, requests to unassign the electronic label assigned to the product and removes the product information stored in the memory.

2. The electronic label of claim 1, wherein the burglarproof ring includes:
    an insulating cloth which wraps an outer circumference of the flexible conductive wire; and
    a hooking piece formed at the other end of the flexible conductive wire.

3. The electronic label of claim 2, wherein the coupling unit includes:
    a fixing groove into which the burglarproof pin formed at the one end of the flexible conductive wire is inserted to pass therethrough and which is hooked on the hooking piece formed at the other end of the flexible conductive wire wrapped with the insulating cloth to fix the flexible conductive wire to the electronic label.

4. The electronic label of claim 1, wherein the controller, when the current interruption is not normal, determines that burglary occurs.

5. The electronic label of claim 1, wherein the controller, in a case in which the burglarproof pin is separated from the pin connector by a pin separating unit, determines that the case is a normal current interruption case.

6. The electronic label of claim 1, wherein the one end of the burglarproof ring and the another end of the burglarproof ring are placed at different heights.

7. The electronic label of claim 3, wherein the pin connector is formed under the fixing groove to be spaced apart from the fixing groove vertically.

8. The electronic label of claim 7, wherein the hooking piece is positioned on a surface opposite to a surface on which the pin connector is formed.

9. An electronic label with a burglarproof function for goods, comprising:
- a short-range wireless communication part configured to receive product information from a management server;
- a memory configured to store the product information received through the short-range wireless communication part;
- a display configured to electronically display the product information stored in the memory; and
- a controller configured to perform overall control of the electronic label including control of receiving, storing, and displaying the product information,
- wherein the electronic label includes a burglarproof ring, which is adapted to be hung on a product, performs a burglarproof function, and is replaceable, and a coupling unit coupled to the burglarproof ring and a warning part configured to warn burglary in a case in which the controller determines that the burglary occurs when of the burglarproof ring is broken,
- wherein one end of the burglarproof ring is placed on a front surface of a substrate of the electronic label, and another end of the burglarproof ring is placed on a rear surface of the substrate of the electronic label,
- wherein the burglarproof ring includes a flexible conductive wire and a burglarproof pin formed at one end of the flexible conductive wire,
- wherein the coupling unit comprises a pin connector connected to the burglarproof pin formed at the one end of the flexible conductive wire, and
- wherein the controller, in a case in which the flexible conductive wire is cut or the burglarproof pin is separated from the pin connector and a current flowing through the flexible conductive wire is interrupted, determines whether the current interruption is normal, and when the current interruption is normal, requests to unassign the electronic label assigned to the product and removes the product information stored in the memory.

10. The electronic label of claim 9, wherein the warning part outputs an alarm sound to perform an acoustic warning.

* * * * *